US012706763B2

(12) United States Patent
Grover et al.

(10) Patent No.: US 12,706,763 B2
(45) **Date of Patent: *Aug. 11, 2026**

(54) AUDIT CHAIN FOR HASHES USING TOKENIZATION

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 18/127,561

(22) Filed: Mar. 28, 2023

(65) Prior Publication Data

US 2024/0333537 A1 Oct. 3, 2024

(51) Int. Cl.
*H04L 29/00* (2006.01)
*H04L 9/00* (2022.01)
*H04L 9/32* (2006.01)

(52) U.S. Cl.
CPC .............. *H04L 9/50* (2022.05); *H04L 9/3213* (2013.01); *H04L 9/3239* (2013.01)

(58) Field of Classification Search
CPC ........ H04L 9/50; H04L 9/3213; H04L 9/3239
See application file for complete search history.

(56) References Cited

U.S. PATENT DOCUMENTS 9,521,123 B2 12/2016 Jueneman
10,671,712 B1 * 6/2020 Lindley ................ H04L 9/3247
11,062,042 B1 7/2021 McKervey et al.
11,232,210 B2 * 1/2022 Lin ....................... G06F 21/575
11,250,507 B2 * 2/2022 Xu ..................... G06Q 20/3827
11,308,185 B1 4/2022 Paczkowski et al.
11,405,189 B1 * 8/2022 Bennison ............ H04L 63/0807
11,741,249 B2 * 8/2023 Joshi ..................... H04L 9/3242 713/165
12,158,835 B1 * 12/2024 Balin .................. G06F 11/3476
12,217,835 B2 * 2/2025 Adhikari ............. G06F 11/3688
12,380,462 B2 * 8/2025 Zimmerman, III .......................... G06Q 30/0207
2007/0255815 A1 * 11/2007 Justice .................. H04L 63/126 709/223

(Continued)

FOREIGN PATENT DOCUMENTS

WO WO-2022122423 A1 6/2022

OTHER PUBLICATIONS

Damian Skeeles; ArcSight Overview of Connector Integrity; Issue 1.0; Nov. 7, 2007; 5 pages.

*Primary Examiner* — Don G Zhao
(74) *Attorney, Agent, or Firm* — Sheridan Ross P.C.

(57) ABSTRACT

A first hash of a record is retrieved. The first hash is tokenized by storing the first hash in a tokenization table that has a corresponding hash token. A request is received to validate the record. The request to validate the record comprises a second hash of the record and a second hash token. In response to receiving the request to validate the record, the record is validated by looking up the first hash in the tokenization table using the second hash token and comparing the looked up first hash to the second hash. In response to the looked up first hash being the same as the second hash, the record is validated. In response to the looked up first hash not being the same as the second hash, the record is not validated.

20 Claims, 8 Drawing Sheets

(56) References Cited

U.S. PATENT DOCUMENTS

2009/0193522 A1 7/2009 Ishikawa et al.
2014/0020109 A1* 1/2014 Mraz .................. H04L 63/0227 726/26
2014/0075568 A1* 3/2014 Sathyadevan ......... G06F 21/554 726/27
2018/0139186 A1 5/2018 Castagna
2018/0367307 A1* 12/2018 Ekberg .................. H04L 63/102
2019/0282906 A1 9/2019 Yong
2019/0305968 A1 10/2019 Versteeg et al.
2019/0347429 A1* 11/2019 Jean-Louis ............ G06N 5/022
2019/0386969 A1* 12/2019 Verzun .................. G06F 21/606
2020/0042494 A1 2/2020 Pillai et al.
2020/0090188 A1* 3/2020 Wince .................. H04L 9/3247
2020/0183883 A1 6/2020 Yang
2020/0235988 A1 7/2020 Lin
2020/0265516 A1* 8/2020 Xu ........................... H04L 9/50
2020/0382310 A1 12/2020 Jayachandran
2021/0240820 A1* 8/2021 Dai ........................... G06F 8/41
2021/0286861 A1* 9/2021 Churchill ................ G06F 21/31
2022/0058289 A1 2/2022 Beardsworth et al.
2022/0114584 A1* 4/2022 Conley .............. G06Q 20/3674
2022/0166629 A1* 5/2022 Dunjic .................. G06F 9/5011
2022/0276850 A1* 9/2022 Gondi ................. G06F 9/45558
2022/0405791 A1* 12/2022 Zimmerman, III .......................... G06Q 30/0207
2023/0049791 A1* 2/2023 Bunker, Jr. ............... H04L 9/50
2023/0091605 A1* 3/2023 Vincent ................. H04L 63/126 705/66
2023/0099057 A1* 3/2023 McCormack ......... H04L 9/3239 726/23
2023/0199236 A1* 6/2023 McGill ................. H04L 9/3239 725/25
2023/0246835 A1* 8/2023 Sharma ................. H04L 9/3213 713/168
2023/0291561 A1* 9/2023 Trock .................... H04L 9/3236
2023/0344650 A1* 10/2023 Hojati ..................... H04L 9/321
2023/0370266 A1* 11/2023 Kondo .................. H04L 9/3239
2024/0291730 A1* 8/2024 Quiles ................. H04L 41/5006
2024/0323018 A1* 9/2024 Rand ......................... H04L 9/50
2024/0333518 A1* 10/2024 Grover ...................... H04L 9/50

* cited by examiner

AUDIT CHAIN FOR HASHES USING TOKENIZATION

FIELD

The disclosure relates generally to auditing software and particularly to auditing software using hash tokens.

BACKGROUND

With the advance of advanced computing (e.g., quantum computing), the ability to find hash collisions (where different data produces the same hash result) leaves the potential for existing hashing techniques to be compromised.

SUMMARY

These and other needs are addressed by the various embodiments and configurations of the present disclosure. The present disclosure can provide a number of advantages depending on the particular configuration. These and other advantages will be apparent from the disclosure contained herein.

A first hash of a record is retrieved. The first hash is tokenized by storing the first hash in a tokenization table that has a corresponding hash token. A request is received to validate the record. The request to validate the record comprises a second hash of the record and a second hash token. In response to receiving the request to validate the record, the record is validated by looking up the first hash in the tokenization table using the second hash token and comparing the looked up first hash to the second hash. In response to the looked up first hash being the same as the second hash, the record is validated. In response to the looked up first hash not being the same as the second hash, the record is not validated.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 4 is a flow diagram of a process for using hash tokens to verify that a record has not been tampered with.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
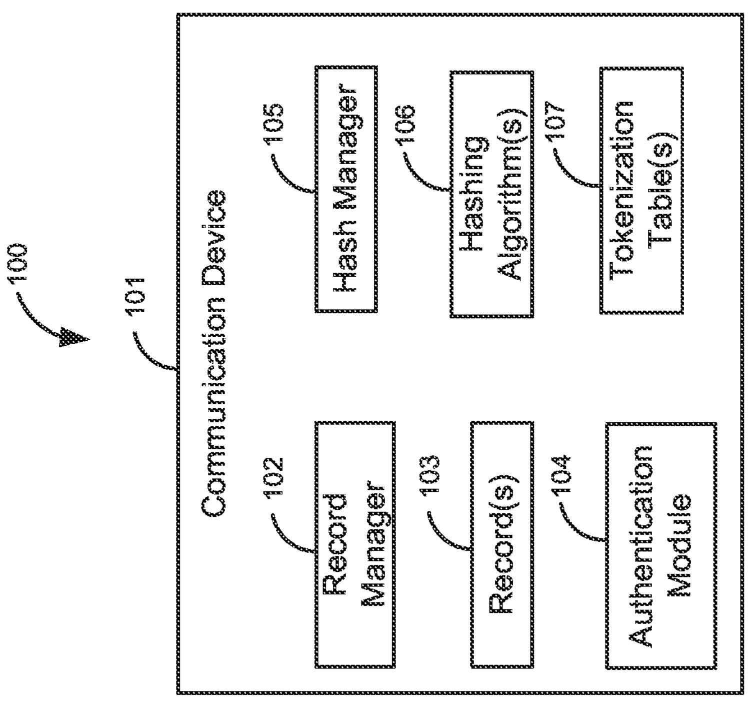
FIG. 1 is a block diagram of a first illustrative system to provide an audit chain by using hash tokens in a tokenization table.

FIG. 1 is a block diagram of a first illustrative system 100 to provide an audit chain by using hash tokens in a tokenization table 107. The first illustrative system 100 comprises a communication device 101.

The communication device 101 can be or may include any device that produces record(s) 103 that need to be protected, such as a Personal Computer (PC), a telephone, a video system, a cellular telephone, a Personal Digital Assistant (PDA), a tablet device, a notebook device, a smartphone, an application server, a database server, a communications server, an email server, a social network, an embedded device, and/or the like. Although not shown in FIG. 1, the communication device 101 may be connected to a network.

The communication device 101 further comprises a record manager 102, record(s) 103, an authentication module 104, a hash manager 105, hashing algorithm(s) 106, and tokenization table(s) 107. The record manager 102 manages the record(s) 103. For example, the record manager 102 may manage reads and writes of the record(s) 103. The record manager 102 may be a database system, an operating system, a hypervisor, and/or any type of system that manages the record(s) 103.

The record(s) 103 may be any type of record 103, such as, database records, blockchains, blockchain blocks, files, documents, medical records, employment records, computer records, user records, network management records, tracking records, corporate records, financial records, and/or the like. The record(s) 103 may comprise multiple types of records 103. For example, the record(s) 103 may comprise different types of database tables, different types of blockchain blocks, and/or the like. The record(s) 103 may be distributed across multiple communication devices 101.

The authentication module 104 can be any hardware coupled with software that provides access to the record(s) 103/tokenization table(s) 107. The authentication module 104 may use multi-factor/level authentication. For example, access to different tokenization table(s) 107 and/or tokens in the tokenization table(s) 107 may require a user to provide different and/or additional authentication factors in order to use the hash tokens to lookup a particular hash. The authentication module 104 may use any type of authentication factors, such as, usernames/passwords, fingerprint scans, iris scans, faceprints, voiceprints, Short Message Service (SMS) codes, one-time passwords, questions, and/or the like. The authentication module 104 may provide multi-tenant access to individual record(s) 103.

The hash manager 105 can be or may include any hardware/software that can be used to manage the overall hashing process to secure data stored in the record(s) 103. The hash manager 105 generates the hashes using the hashing algorithm(s) 106. The hashing algorithm(s) 106 used may be in different ways based on rules. A user/administrator may administer the rules.

The hashing algorithm(s) 106 may be any known hashing algorithm 106 (or a new hashing algorithm 106), such as, Message Digest 5 (MD5), Secure Hashing Algorithm (SHA), Whirlpool, Race Integrity Primitives Evaluation Message Digest (RIPEMD), Cyclic Redundancy Code (CRC), and/or the like. The hashing algorithm(s) 106 used may vary based on rules, based on the type of record 103 being hashed, based on a particular tenant, and/or the like.

The tokenization table(s) 107 may be any type of tokenization table 107. Table 1 is an example of a tokenization table 107. The tokenization table 107 in Table 1 comprises five columns: 1) a row number column, a hash token column, a hash column, a record ID column, and a hash ID column. Table one also has four rows (rows 1-N when N could be any positive integer above three).

TABLE 1

| Row Number | Hash Token | Hash | Record ID | Hash ID |
|---|---|---|---|---|
| 1 | 1339448223 | AC146B2C99044639AC45 | 1 | 1 |
| 2 | 9282703450 | 31343CDF223145A32B49 | 1 | 2 |
| 3 | 9027234740 | 8F22972AA92349CB1133 | 2 | 1 |
| N | 3234249232 | 343AC136790CDA9878C4 | 2 | 2 |

In row 1, the hash token 1339448223 has a corresponding hash (AC146B2C99044639AC45). In row 2, the hash token 282703450 has the corresponding hash (31343CDF223145A32B49). In row 3, the hash token 9027234740 has the corresponding hash 8F22972AA92349CB1133. In row N, the hash token 3234249232 has the corresponding hash 343AC136790CDA9878C4. When accessing the tokenization table 107, a hash token is provided; the hash token is used to lookup the corresponding hash. The corresponding hash is then returned. For example, if the hash token 9282703450 was provided, the corresponding hash 31343CDF223145A32B49 will be looked up and then returned (assuming that the user has the proper access privileges for that particular hash token). Because the hash token is not mathematically related to the hash, the use of hash tokens obfuscates the hash. In addition, tokenization is quantum computing resistant because the token is not mathematically related to the hash.

The record ID identifies an associated record 103 and the hash ID identifies a specific hash in the record 103. For the hash token 1339448223, the record ID is one and the hash ID is one. For the hash token 9282703450, the record ID is one and the hash ID is two (a second hash in record two). For the hash token 9027234740, the record ID is two and the hash ID is one. For the hash token 3234249232 the record ID is two and the hash ID is 2.

The record ID/Hash ID can be tied to an authentication process. For example, a specific user (e.g., user one) may only have access to record 1 (e.g., user one is associated with tenant one). A second user may only have access to hash one in record two. Thus, if the hash token 1339448223 (record one/hash one) is presented by the second user, the second user will be denied access to the corresponding hash AC146B2C99044639AC45 because the second user does not have the proper access privileges for the hash token 1339448223.

The tokenization table 107 may be different than shown in Table 1 based on implementation. For example, the tokenization table 107 may only have a hash token column and a hash column. Likewise, the size of the tokenization table 107 may vary based on implementation. For example, for one embodiment, the size of the tokenization table 107 may be less than then thousand rows and in another embodiment, the size of the tokenization table may have millions of rows. In one embodiment, some rows may not have an entry or may not have a corresponding hash. For example, the hash tokens may be created and added to the tokenization table 107 as an initialization process. New hashes can then be added to the tokenization table 107 at a later point in time or in real-time.

Figure 2:
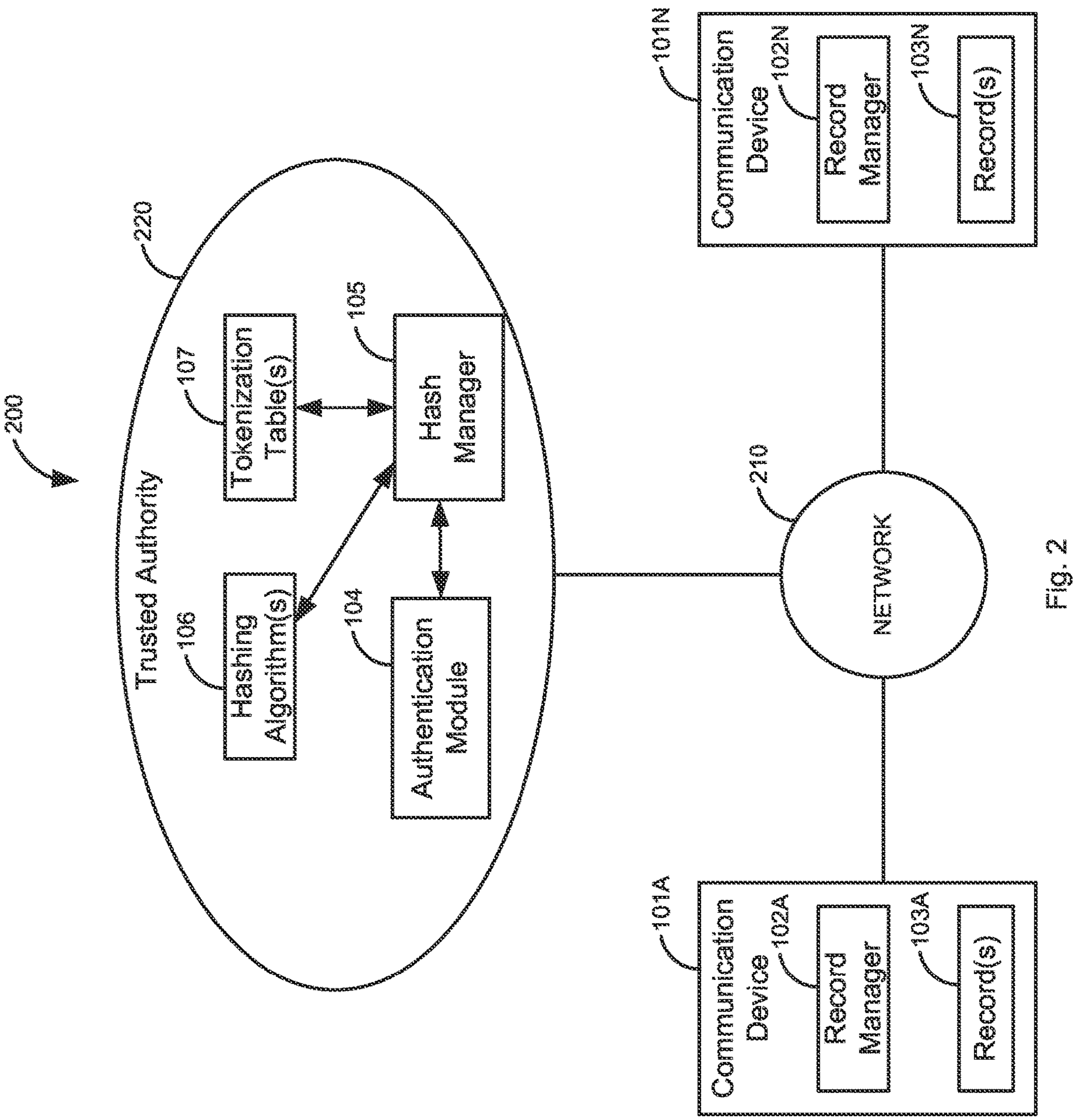
FIG. 2 is a block diagram of a second illustrative system to provide an audit chain by using hash tokens in a tokenization table.

FIG. 2 is a block diagram of a second illustrative system to provide an audit chain by using hash tokens in a tokenization table 107. The second illustrative system 200 comprises communication devices 101A-101N, a network 210, and a trusted authority 220.

The communication devices 101A-101N are similar to the communication device 101 described in FIG. 1. The communication devices 101A-101N comprise record managers 102A-102N and records 103A-103N. The record managers 102A-102N are similar to the record manager 102 described in FIG. 1. In addition, the record managers 102A-102N may collaborate with the trusted authority 220 to validate the records 103A-103N. The records 103A-103N are similar to the record(s) 103 described in FIG. 1.

The network 210 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 210 is an electronic communication network configured to carry messages via packets and/or circuit switched communications.

The trusted authority 220 is an auditing service that can be used to validate hashes of the record(s) 103 using token hashes/tokenization table(s) 107. For example, the trusted authority 220 may be used to audit blocks in a blockchain or database records 103 using the hash tokens/tokenization table(s) 107. In FIG. 2, the trusted authority 220 comprises the authentication module 104, the hash manager 105, the hashing algorithms 106, and the tokenization table(s) 107. In FIG. 2, the authentication module 104, the hash manager 105, and the hashing algorithm(s) 106 are shown as part of the trusted authority 220. In one embodiment, the authentication module 104, hash manager 105, and/or the hashing algorithm(s) 106 may be distributed between the trusted authority 220 and the communication devices 101A-101N.

Figure 3:
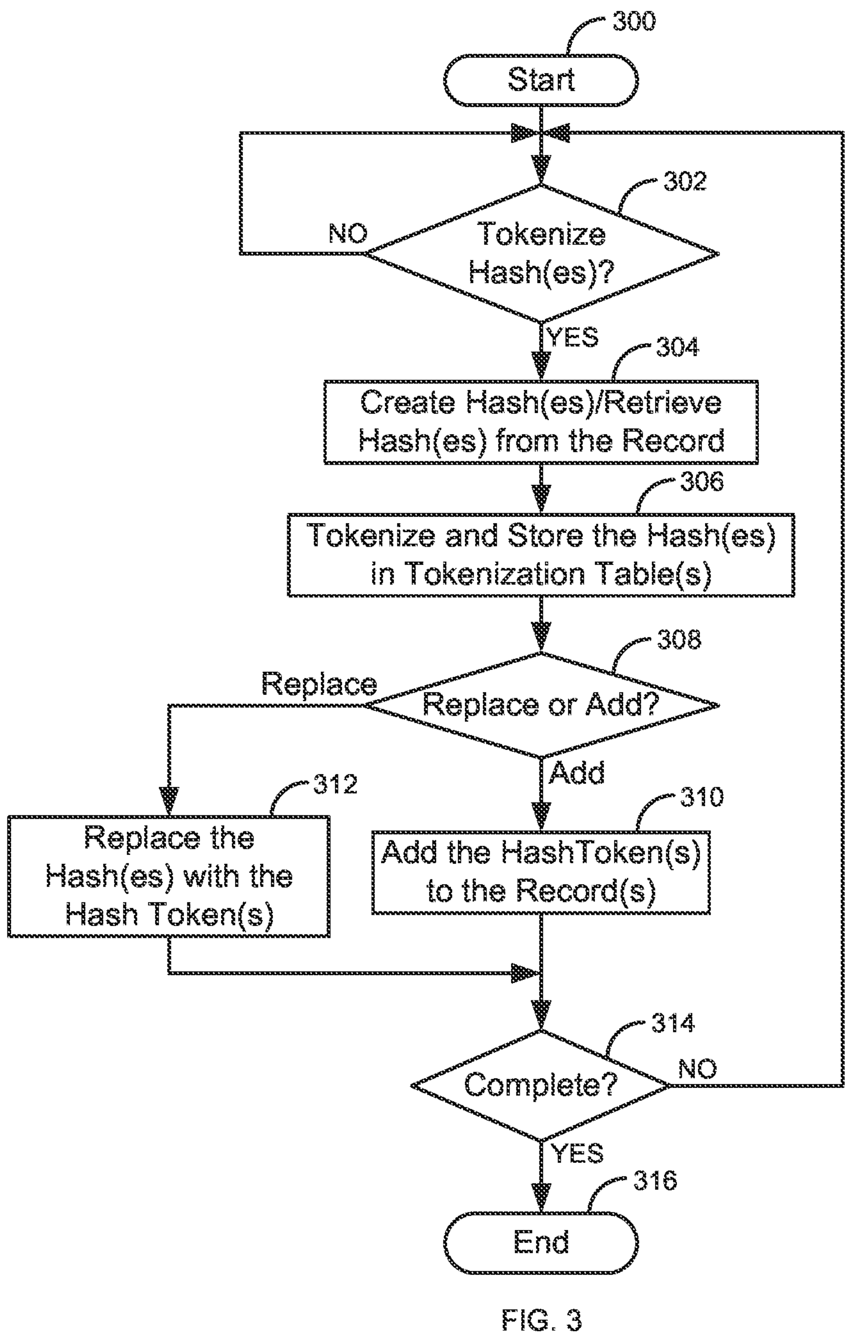
FIG. 3 is a flow diagram of a process for generating and storing hash tokens in a record.

FIG. 3 is a flow diagram of a process for generating and storing hash tokens in a record 103. Illustratively, the communication device 101/101A-101N, the record manager 102/record managers 102A-102N, the record(s) 103/103A-103N, the authentication module 104, the hash manager 105, and the hashing algorithm(s) 106 are stored-program-controlled entities, such as a computer or microprocessor, which performs the method of FIGS. 3-4/7-8 and the processes described herein by executing program instructions stored in a computer readable storage medium, such as a memory (i.e., a computer memory, a hard disk, and/or the like). Although the methods described in FIGS. 3-4/7-8 are shown in a specific order, one of skill in the art would recognize that the steps in FIGS. 3-4/7-8 may be implemented in different orders and/or be implemented in a multi-threaded environment. Moreover, various steps may be omitted or added based on implementation.

The process starts in step 300. The hash manager 105 determines, in step 302, if there are any hashes to be tokenized. What hashes to tokenize may be defined based on various rules. For example, the rules may determine that only hash(es) in specific record(s) 103 will tokenized while other records 103 will use non-tokenized hashes or have no hashes. The rules may be based on new and/or existing hash(es) in the record(s) 103. The rules may define specific types of record(s) 103 that will be tokenized. If there are not any hash(es) to tokenize in step 302, the process of step 302 repeats.

If there are hash(es) to tokenize in step 302, the hash manager 105 creates/retrieves new hash(es) and/or retrieves existing hash(es) in the record(s) 103 in step 304. For example, the request may be to tokenize all existing hashes in an existing blockchain. The hash manager 105 tokenizes the hash(es) and stores the hash(es) in the tokenization table(s) 107 in step 306. For each hash there is a corresponding hash token in the tokenization table 107 (e.g., as described above in Table 1).

The hash manager 105 determines, in step 308, if the hash(es) are going to replace existing hash(es) in the record 103 or if new hash(es) are to be added to the record(s) 103. If existing hash(es) are going to be replaced with hash token(s) in step 308, the hash(es) are replaced, in step 312, with the hash token(s) in the record 103 and the process goes to step 314.

Otherwise, if the hash token(s) are to be added to the record(s) 103 in step 308, the hash token(s) are added to the record(s) 103 (e.g., the hash token is added in part of a database table) in step 310 and the process goes to step 314. In one embodiment, the hash token(s) may be stored outside the record(s) 103. For example, the hash token(s) may be stored in a separate record 103 (e.g., a file).

The hash manager 105 determines, in step 314, if the process is complete. If the process is not complete in step 314, the process goes back to step 302. Otherwise, if the process is complete in step 314, the process ends in step 316.

In one embodiment, some, or all of the data in the record(s) 103 may be hashed. For example, the record 103 may be a user's medical record where only a portion of the medical record is hashed.

Figure 4:
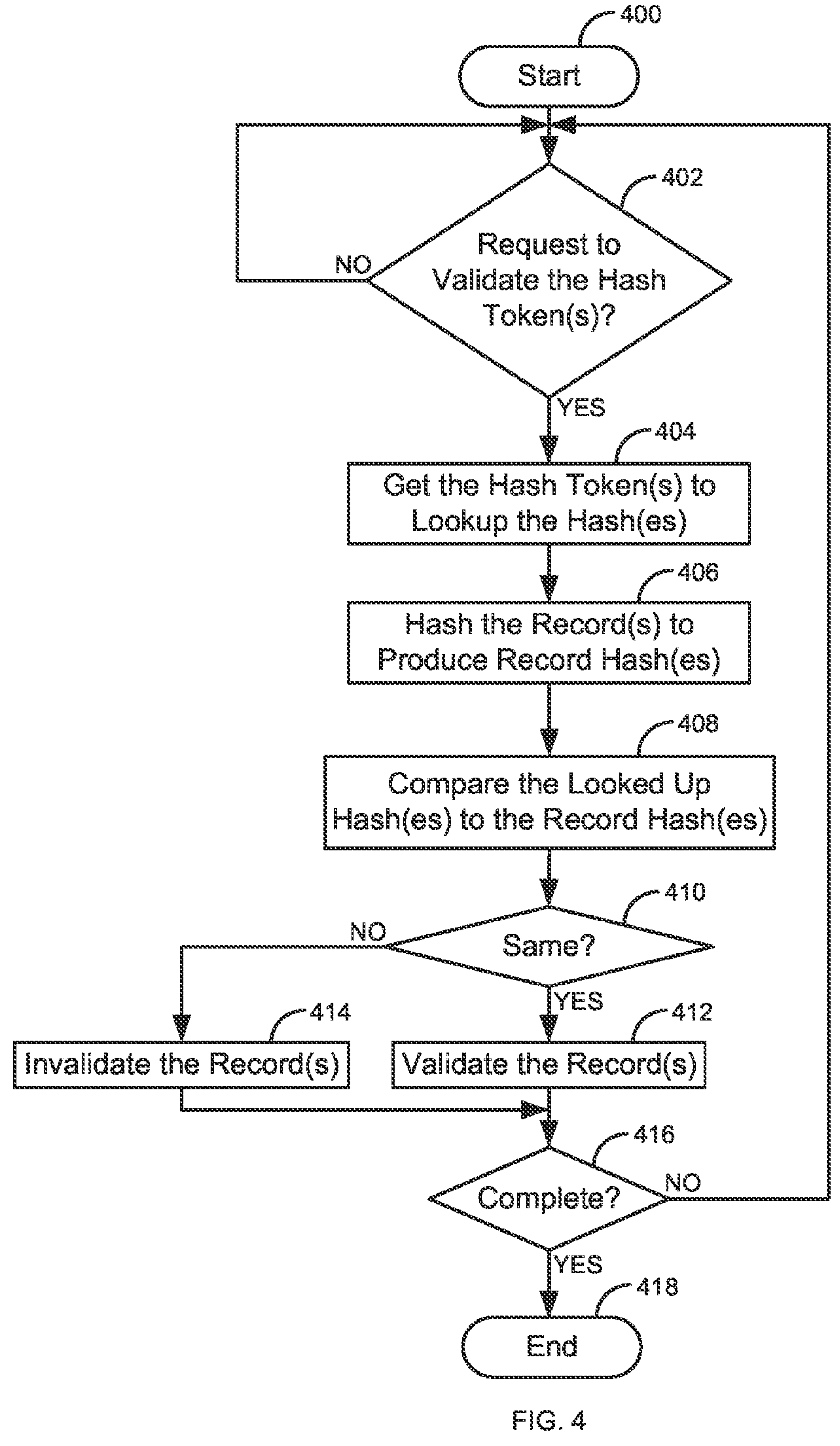

FIG. 4 is a flow diagram of a process for using hash tokens to verify that a record 103 has not been tampered with. The process starts in step 400. The hash manager 105 determines, in step 402, if a request to validate the hash token(s) has been received. If a request to validate the hash token(s) has not been received in step 402, the process of step 402 repeats.

Otherwise, if a request to validate the hash token(s) has been received in step 402, the hash manager 105 uses the hash token(s) (e.g., in the record(s) 103) to lookup the corresponding hash(es) in step 404. The hash manager 105 hashes the record(s) 103 to produce record hash(es) in step 406. The hash manager 105 compares the record hash(es) to the looked-up hash(es) from the tokenization table(s) 107 in step 408. If the record hash(es) are the same as the looked-up hash(es) in step 410, the record(s) 103 are validated in step 412 and the process goes to step 416. Otherwise, if the record hash(es) are different from the looked-up hash(es) in step 410, the hash manager 105 invalidates the record(s) 103 in step 414. If the hash(es) don't match, this indicates that the record(s) 103 may have been tampered with or have been corrupted in some way.

The hash manager 105 determines, in step 416, if the process is complete. If the process is not complete in step 416, the process goes to step 402. Otherwise, if the process is complete in step 416, the process ends in step 418.

Figure 5:
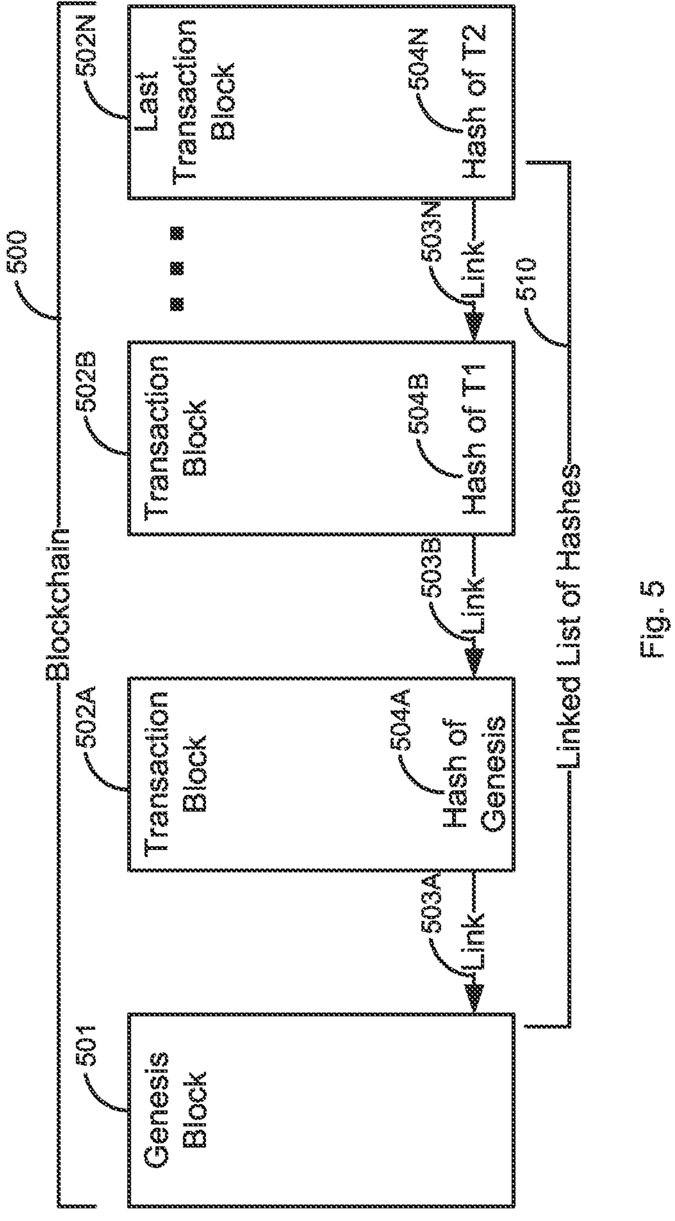
FIG. 5 is a block diagram of a blockchain with hashes.

FIG. 5 is a block diagram of a blockchain 500 with hashes 504A-504N. The blockchain 500 is an example of a traditional blockchain 500. The blockchain 500 comprises a genesis block 501 and transaction blocks 502A-502N.

The genesis block 501 is the first block that is crated when the blockchain 500 is created. The transaction blocks 502A-502N are created based on transactions. A transaction is an event that is tracked in the blockchain 500. For example, an event may be an exchange of a cryptocurrency, a network event, an access to an account, a user login, a user logout, a change to a record 103, a change in privileges on an account, and/or the like. The transaction blocks 502A-502N may store different types of transactions/data. For example, the transaction block 502A may store data about a user access event to the user's bank account and the transaction block 502B may store data about a change in account value of the user's bank account.

The blockchain 500 is linked together by the links 503A-503N. The links 503A-503N are pointers to the previous block 501/502A/502B. The link 503A points to the genesis block 501. The link 503B points to the transaction block 502A. The link 503N points to the transaction block 502B. Each of the transaction blocks 502A-502B has a hash 504A-504N of the previous block. The hash 504A is a hash of the genesis block 501. The hash 504B is a hash of the transaction block 502A. The hash 504N is a hash of the transaction block 502B.

The hashes 504A-504N and the links 503A-503N form a linked list of hashes 510 that links each of the blocks 501/502A-502N in the blockchain 500 together. The linked list of hashes 510 is used to validate the integrity of each of the blocks 501/502A-502N in the blockchain 500. This is done by validating the hash 504 of the previous block 501/502 to make sure that the previous block 501/502 has not been changed. The linked list of hashes 510, coupled with the blockchain 500 being replicated in a distributed ledger are used to make the blockchain 500 highly immutable. Although the linked list of hashes 510 is described using forward links, the links 503 may be reverse links (i.e., links that point in the opposite direction) that have corresponding reverse hashes or a combination of both.

Figure 6:
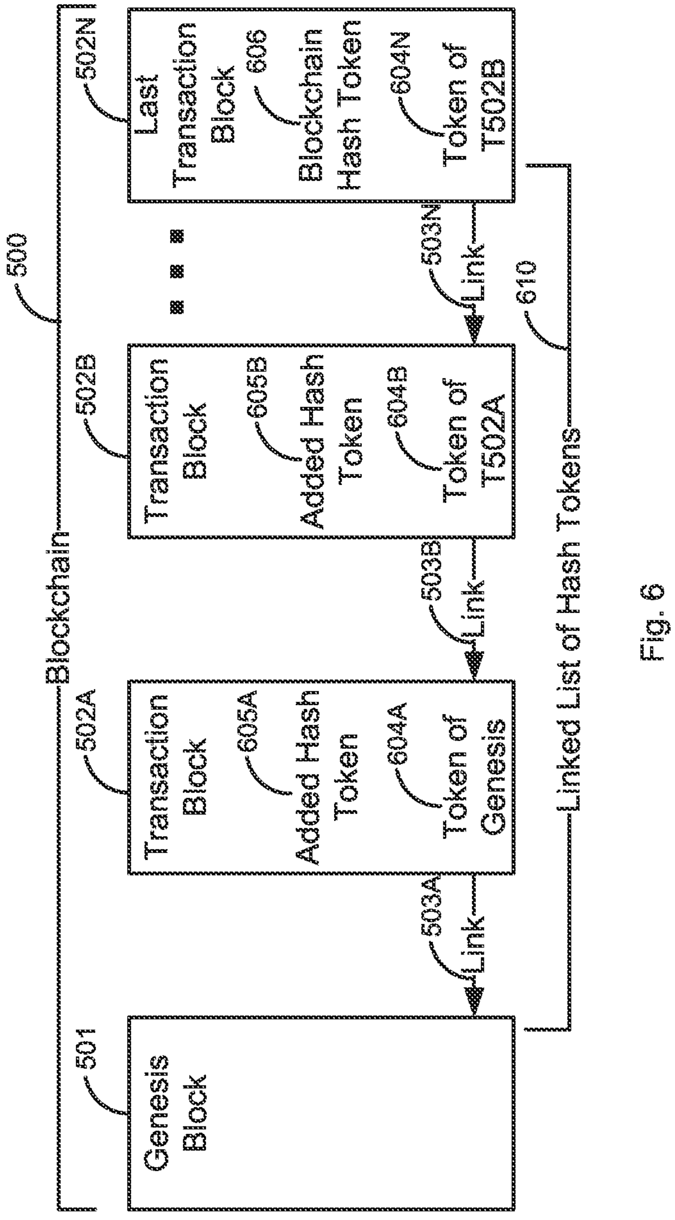
FIG. 6 is a block diagram of a blockchain that uses hash tokens.

FIG. 6 is a block diagram of a blockchain 500 that uses hash tokens. The blockchain 500 comprises the genesis block 501 and the transaction blocks 502A-502N. Instead of the hashes 504A-504N, the blockchain 500 of FIG. 6 has hash tokens 604A-604N. The hash tokens 604A-604N along with the links 503A-503N form a linked list of hash tokens 610.

The hash tokens 604A-604N may be generated and added to the transaction blocks 502A-502N when each transaction block 502 is added to the blockchain 500. Alternatively, the hash tokens 604A-604N may be retroactively added after the transaction blocks 502A-502N are created by replacing the hashes 504A-504N with the hash tokens 604A-604N.

In addition, each of the transaction blocks 502A-502B has added hash tokens 605A-605B. The added hash tokens 605A-605B are hash tokens of hashes of the same block 502. For example, the added hash token 605A is a hash token for the hash of the transaction block 502A. The added hash tokens 605A-605B may use the same or a different hashing algorithm 106 than the hash tokens 604A-604N.

The added hash tokens 605A-605B may be generated and added to the transaction blocks 502A-502N when each transaction block 502 is added to the blockchain 500. Alternatively, the added hash tokens 605A-605B may be retroactively added after the transaction blocks 502A-502B are created. Although not shown, the transaction block 502N may also have an added hash token (e.g., added hash token 605N).

By adding the hash tokens 604A-604N/added hash tokens 605A-605B/blockchain hash token 606, this allows the trusted authority 220 (e.g., a notary) to then lookup the corresponding hashes in the tokenization table(s) 107. Because only the trusted authority 220 can look up the corresponding hashes, a malicious party will be unable to identify any hash collisions because the hash tokens have no mathematical relationship to the hash tokens 604A-604N/605A-605B/606.

The last transaction block 502N of a completed blockchain 500 may also have a blockchain hash token 606. The corresponding hash for the blockchain hash token 606 is a full hash of the blockchain 500. This can be used to validate the completed blockchain 500. The hashing algorithm(s) 106 used for individual transaction blocks 502/last transaction block 502N may use a different and/or the same hashing algorithm 106 as the blockchain 500.

The blockchain 500 may have any combination of hash tokens 604, 605, 606 and/or hashes 504. For example, the blockchain 500 may only have the hash tokens 604A-604N. Alternatively, the blockchain 500 may have the hashes 504A-504N and the added hash tokens 605A-605B/blockchain hash token 606.

While described using blockchains 500, this technique can be used in various other environments, such as, file verification, record 103 verification, and/or the like. For example, the added hash token(s) 605 could be added in a document/file where only the trusted authority 220 can be used to validate the document/file. Since a person cannot access the tokenization table 107, they cannot determine how to change the document/file to create a hash collision.

There may be multiple authentication levels used to validate different transaction blocks 502/records 103 by the authentication manager 104. For example, level one authentication may be tied to a record ID/hash ID to validate a specific type of transaction block 502. Level two authentication can be used to validate a second kind of transaction block 502. Multiple authentication levels may be associated with different hashing algorithm(s) 106. The hash tokens may be assigned on a tenant basis. For example, the trusted authority 220 may have different tokenization tables 107 for different tenants. The hash tokens may also have an associated authentication level/tenant. For example, tenant A may have hash tokens that require two different authentication levels and tenant B may have three hash tokens that require three different authentication levels.

Figure 7:
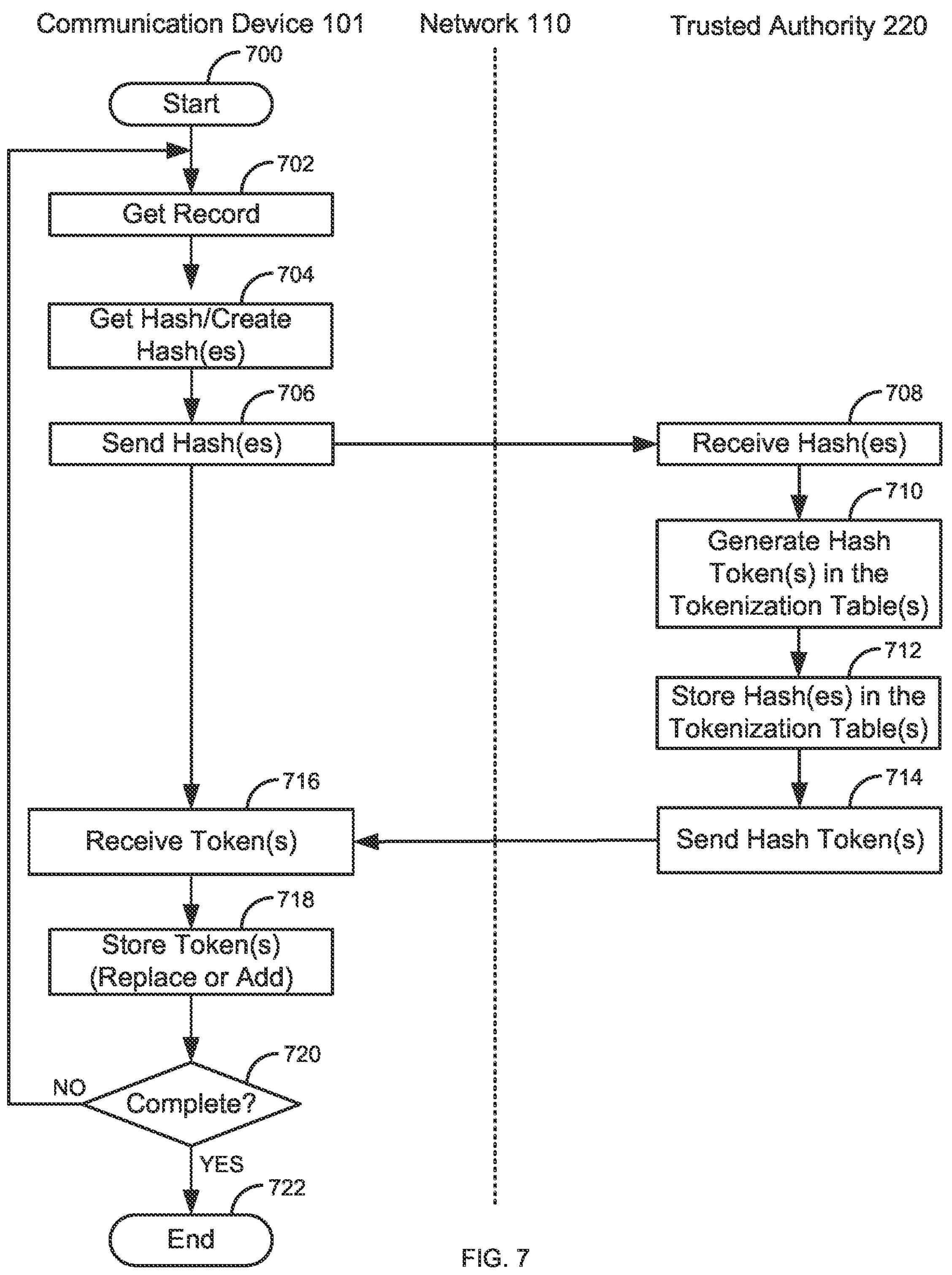
FIG. 7 is a flow diagram of a process where a trusted authority is used to generate hash tokens.

FIG. 7 is a flow diagram of a process where a trusted authority 220 is used to generate hash tokens. The process starts, in step 700, on the communication device 101. The communication device 101 gets the record(s) 102 in step 702. The communication device 101 gets the hash(es) and/or creates the hashes for the record(s) 102 in step 704. The communication device 101 sends the hash(es) to the trusted authority 220 in step 706. The message of step 706 may include other information, such as, record identifier(s), hash identifier(s) (e.g., the record 103 has multiple hashes), hashing algorithms 106 to be used, and/or the like.

The trusted authority 220 receives the hash(es) in step 708. The trusted authority 220 generates/gets the tokenization table(s) 107/hash token(s) in step 710. For example, the trusted authority 220 may create a new tokenization table 107 and a new hash token in step 710. The trusted authority 220 stores the hash(es)/corresponding hash token(s) in the tokenization table(s) 107 in step 712. In addition, other information may be stored in step 712, such as, record identifier(s), a hash identifier(s), hashing algorithm(s) 106 used, and/or the like. The trusted authority 220 sends the corresponding hash token(s) to the communication device 101 in step 714. The message of step 714 may also comprise other information, such as, a record ID, a hash ID, a tokenization table ID, and/or the like. For example, if there are multiple tokenization tables 107 being used, each tokenization table 107 may have a unique identifier that is sent in step 714. The communication device 101 may use the tokenization table ID when validating the record 103 as described in FIG. 8.

The communication device 101 receives the hash token(s) in step 716. The communication device 101 stores, in step 718, the hash token(s) by adding and/or replacing the existing hash(es) in the record 103 with the hash token(s). The communication device 101 determines, in step 720, if the process is complete. If the process is not complete, in step 720, the process goes back to step 702. Otherwise, if the process is complete in step 720, the process ends in step 722.

Figure 8:
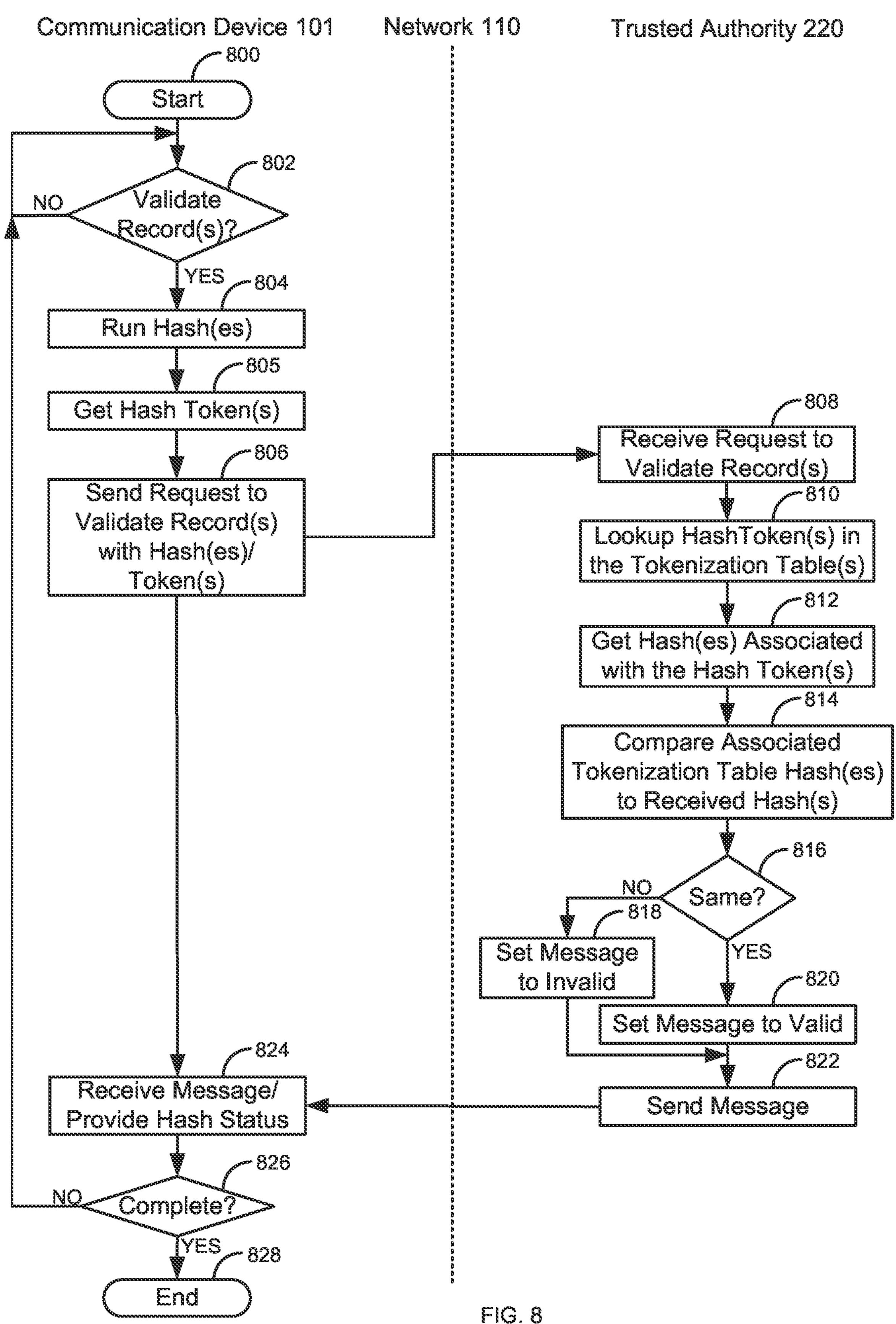
FIG. 8 is a flow diagram of a process where a trusted authority is used to validate a hash token of a record.

FIG. 8 is a flow diagram of a process where a trusted authority 220 is used to validate a hash token of a record 103. The process starts on the communication device 101 in step 800. The communication device 101 determines, in step 802, if the record(s) 103 need to be validated. If the record(s) 103 are not to be validated in step 802, the process of step 802 repeats.

Otherwise, if the record(s) 103 are to be validated in step 802, the communication device 101 runs hash(es) over the record(s) 103/data in the record(s) 103 that are to be validated in step 804. The communication device 101 gets the hash token(s) in step 805 (e.g., from the record(s) 103). The communication device 101 sends a request to validate the record(s) 103 to the trusted authority 220 in step 806. The request of step 806 includes the hash(es) generated in step 804 and the hash token(s) from step 805. In addition, the request of step 806 may include record identifier(s), hash identifier(s), tokenization table identifiers, and/or the like.

The trusted authority 220 receives the request to validate the record(s) 103 in step 808. The request of step 808 may include a tokenization table ID(s) that is used to identify the tokenization table(s) 107 if there is more than one tokenization table 107. The trusted authority 220 looks up the corresponding hash token(s) in the tokenization table(s) 107 in step 810. The trusted authority 220 gets the corresponding hash(es) based on the hash token(s) in step 812.

The trusted authority 220 compares, in step 814, the corresponding hash(es) from the tokenization table(s) 107 from step 812 to the received hash(es) of step 808. If the hash(es) are the same in step 816, the message is set to indicate the hash(es) are valid in step 818. Otherwise, if the hash(es) are not the same in in step 816, the message is set to invalid in step 820. If some of the hash(es) are valid and some of the hash(es) are invalid, the message will indicate which of the hash(es) are valid and which of the hash(es) are invalid. The trusted authority then sends the message 220, in step 822 to the communication device 101.

The communication device 101 receives the message in step 824. The communication device 101 also provides the hash status in step 824. For example, an administrator may be notified that a record 103 may have been compromised or corrupted. Although not shown, step 824 may include an action, such as, locking the record 103, denying access to the record 103, restoring the record 103 from a backup system, and/or the like. The action may be automated and/or based on user input.

The communication device 101 determines, in step 826, if the process is complete. If the process is not complete in step 826, the process goes back to step 802. Otherwise, the process ends in step 828.

In one embodiment, the trusted authority manages 220 manages the tokenization. The customer registers with trusted authority 220 (a Notary). Because the trusted authority 220 creates the token(s), the trusted authority 220 assigns token(s) which it also associates with the customer. The trusted authority 220 notarizes the request. The request is sent to the trusted authority 220. The trusted authority 220 looks up customer code the hash(es) in the tokenization table 107 (e.g., on a per customer basis). The trusted authority 220 sends back the hash(es). The customer then compares hashes and validates that the hashes match.

All the processes described herein may be used based on the systems described in FIGS. 1-2. In addition, embodiments that are a combination of FIGS. 1-2 may be implemented. For example, the authentication module 104, the hash manager 105, the hashing algorithm(s) 106, and/or the tokenization table(s) 107 may reside on the communication device 101, in the trusted authority 220, in a combination of the two, or may be distributed between the communication devices 101A-101N and the trusted authority 220.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD. PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

retrieve a first hash of a record;

tokenize the first hash by storing the first hash in a tokenization table that has a corresponding hash token, the corresponding hash token not being mathematically related to the first hash;

receive a request to validate the record, wherein the request to validate the record comprises a second hash of the record and a second hash token, wherein the record is a blockchain, wherein the second hash token comprises a plurality of bash tokens, and wherein the plurality of hash tokens are stored in separate tokenization tables based on a plurality of different types of blocks and/or different tenants;

in response to receiving the request to validate the record, validate the record by:

looking up the first hash in the tokenization table using the second hash token; and comparing the looked-up first hash to the second hash;

in response to the looked-up first hash being the same as the second hash, validating the record; and in response to the looked-up first hash not being the same as the second hash, not validating the record.

2. The system of claim 1, wherein the second hash token is stored in the record and wherein storing the second hash token in the record comprises one of: replacing the first hash with the second hash token or adding the second hash token to the record.

3. The system of claim 2, wherein storing the second hash token in the record comprises adding the second hash token to the record.

4. The system of claim 3, wherein the record is a newly added block in a blockchain and wherein the second hash token is for a hash of a previous block in the blockchain.

5. The system of claim 3, wherein the record is a transaction block in a blockchain, wherein the second hash token is for a hash of the blockchain and/or a hash of the transaction block, and wherein the second hash token is not mathematically related to the second hash.

6. The system of claim 2, wherein storing the second hash token in the record comprises replacing the first hash with the second hash token.

7. The system of claim 6, wherein the second hash token replaces a hash of a previous block in a blockchain.

8. The system of claim 2, wherein the second hash token comprises a plurality of hash tokens of previous blocks in a blockchain that are stored in the blockchain and wherein each of the plurality of hash tokens has a corresponding hash in the tokenization table.

9. The system of claim 1, wherein the record is a blockchain that comprises a plurality of different types of blocks and wherein the second hash token comprises a plurality of hash tokens for each of the plurality of different types of blocks.

10. The system of claim 1, wherein the corresponding hash token has an associated authentication level in order to access the tokenization table.

11. The system of claim 1, wherein the corresponding hash token comprises a plurality of corresponding hash tokens associated with a plurality of tenants and wherein each of the plurality of corresponding hash tokens has an associated authentication level to access each of the corresponding hash tokens.

12. The system of claim 1, wherein the request to validate the record comprises a tokenization table identifier and wherein the tokenization table identifier is used to find the tokenization table in order to look up the first hash in the tokenization table.

13. A method comprising:

retrieving, by a microprocessor, a first hash of a record;

tokenizing, by the microprocessor, the first hash by storing the first hash in a tokenization table that has a corresponding hash token, the corresponding hash token not being mathematically related to the first hash;

receiving, by the microprocessor, a request to validate the record, wherein the request to validate the record comprises a second hash of the record and a second hash token, wherein the record is a blockchain that comprises a plurality of different types of blocks and wherein the second hash token comprises a plurality of bash tokens for each of the plurality of different types of blocks;

in response to receiving the request to validate the record, validating the record by:

looking up the first hash in the tokenization table using the second hash token; and comparing the looked-up first hash to the second hash;

in response to the looked-up first hash being the same as the second hash, validating the record; and in response to the looked-up first hash not being the same as the second hash, not validating the record.

14. The method of claim 13, wherein the second hash token is not mathematically related to the second hash, wherein the second hash token is stored in the record and wherein storing the second hash token in the record comprises one of: replacing the first hash with the second hash token or adding the second hash token to the record.

15. The method of claim 14, wherein storing the second hash token in the record comprises adding the second hash token to the record.

16. The method of claim 15, wherein the record is a newly added block in a blockchain and wherein the second hash token is for a hash of a previous block in the blockchain.

17. The method of claim 14, wherein storing the second hash token in the record comprises replacing the first hash with the second hash token.

18. A system comprising:

a microprocessor; and a computer readable medium, coupled with the microprocessor and comprising microprocessor readable and executable instructions that, when executed by the microprocessor, cause the microprocessor to:

receive a first hash of a record from a communication device;

tokenize the first hash by storing the first hash in a tokenization table that has a corresponding hash token, the corresponding hash token not being mathematically related to the first hash;

send the corresponding hash token to the communication device;

receive a request to validate the record from the communication device, wherein the request to validate the record comprises a second hash of the record and a second hash token, wherein the request to validate the record comprises a tokenization table identifier and wherein the tokenization table identifier is used to find the tokenization table to look up the first hash in the tokenization table;

in response to receiving the request to validate the record, validate the record by:

looking up the first hash in the tokenization table using the second hash token; and comparing the looked-up first hash to the second hash;

in response to the looked-up first hash being the same as the second hash, validating the record; and in response to the looked-up first hash not being the same as the second hash, not validating the record.

19. The system of claim 18, wherein the second hash token is not mathematically related to the second hash.

20. The system of claim 18, wherein the record is a blockchain, wherein the second hash token comprises a plurality of hash tokens, and wherein the plurality of hash tokens are stored in separate tokenization tables based on a plurality of different types of blocks and/or different tenants.

* * * * *